United States Patent
Shim et al.

(10) Patent No.: US 10,330,886 B2
(45) Date of Patent: Jun. 25, 2019

(54) AUTOFOCUS DRIVING UNIT AND PHOTOGRAPHING APPARATUS HAVING THE SAME

(71) Applicant: Samsung Electronics Co., Ltd., Suwon-si, Gyeonggi-do (KR)

(72) Inventors: Jae-kyu Shim, Suwon-si (KR); Bon-min Koo, Seoul (KR); Woo-jong Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/120,609

(22) PCT Filed: Dec. 11, 2014

(86) PCT No.: PCT/KR2014/012207
§ 371 (c)(1),
(2) Date: Aug. 22, 2016

(87) PCT Pub. No.: WO2015/174603
PCT Pub. Date: Nov. 19, 2015

(65) Prior Publication Data
US 2017/0068068 A1    Mar. 9, 2017

(30) Foreign Application Priority Data
May 16, 2014    (KR) .................. 10-2014-0059293

(51) Int. Cl.
G02B 7/02 (2006.01)
G02B 7/08 (2006.01)
(Continued)

(52) U.S. Cl.
CPC ............... G02B 7/08 (2013.01); G02B 7/09 (2013.01); G03B 3/10 (2013.01)

(58) Field of Classification Search
CPC . G02B 7/08; G02B 7/023; G02B 7/04; G02B 7/02; G02B 7/021; G02B 3/00; G11B 7/0932
(Continued)

(56) References Cited

U.S. PATENT DOCUMENTS 7,515,199 B2    4/2009  Kawai et al.
8,743,267 B2    6/2014  Ishikawa et al.
(Continued)

FOREIGN PATENT DOCUMENTS

JP    2006-078734 A    3/2006
JP    2006-091067 A    4/2006
(Continued)

*Primary Examiner* — Dawayne Pinkney
(74) *Attorney, Agent, or Firm* — Jefferson IP Law, LLP

(57) ABSTRACT

An autofocus driving unit for moving a lens holder supporting at least one lens in an optical axis direction with respect to an image sensor. The autofocus driving unit includes: a lead screw that has a length in a direction parallel to an optical axis and rotates to move the lens holder in the optical axis direction; a first driving source that rotates the lead screw so that the lead screw moves in multiple integers of a first distance in the optical axis direction and that comprises a rotor mounted in an outer circumference of the lead screw and a stator that is spaced apart from the rotor and rotates the rotor; and a second driving source that moves the lead screw and the rotor in a first direction that is parallel to the optical axis with respect to the stator so that the lens holder is moved by a second distance that is different from the first distance in the optical axis direction.

11 Claims, 7 Drawing Sheets

(51) Int. Cl.
*G02B 7/09* (2006.01)
*G03B 3/10* (2006.01)

(58) Field of Classification Search
USPC .................................................. 359/811–830
See application file for complete search history.

(56) References Cited

U.S. PATENT DOCUMENTS

| | | | |
|---|---|---|---|
| 2008/0037092 A1* | 2/2008 | Umezu | G02B 5/205 359/227 |
| 2010/0296804 A1* | 11/2010 | Oya | H04N 5/23212 396/125 |
| 2011/0141340 A1* | 6/2011 | Yumiki | G02B 7/08 348/345 |
| 2013/0286278 A1 | 10/2013 | Asano | |
| 2014/0333725 A1 | 11/2014 | Park | |

FOREIGN PATENT DOCUMENTS

| | | |
|---|---|---|
| JP | 2013-097024 A | 5/2013 |
| JP | 2013-231820 A | 11/2013 |
| KR | 10-2013-0068764 A | 6/2013 |

\* cited by examiner

[Fig. 1]
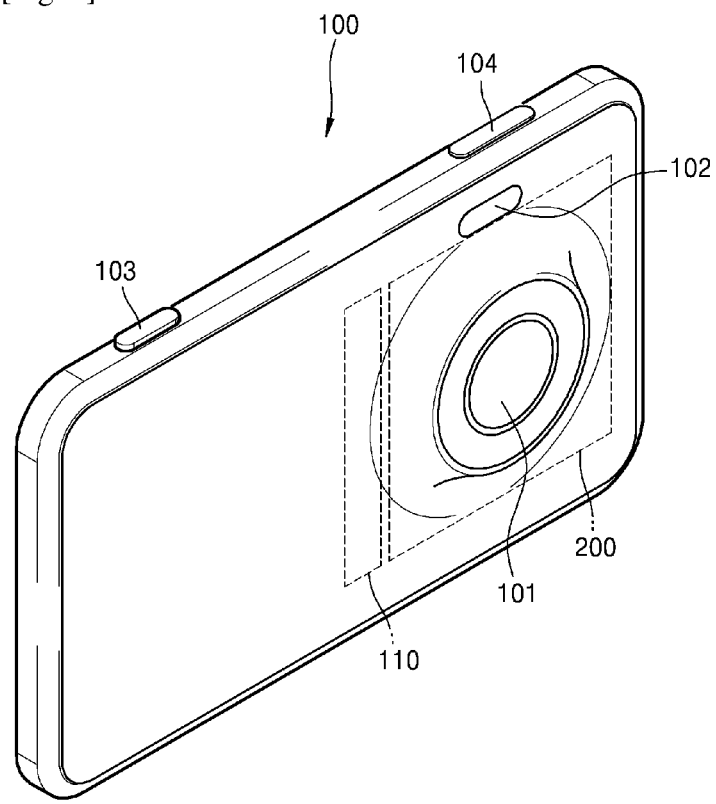
[Fig. 2]
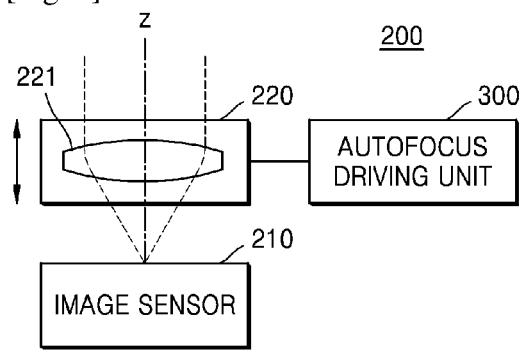

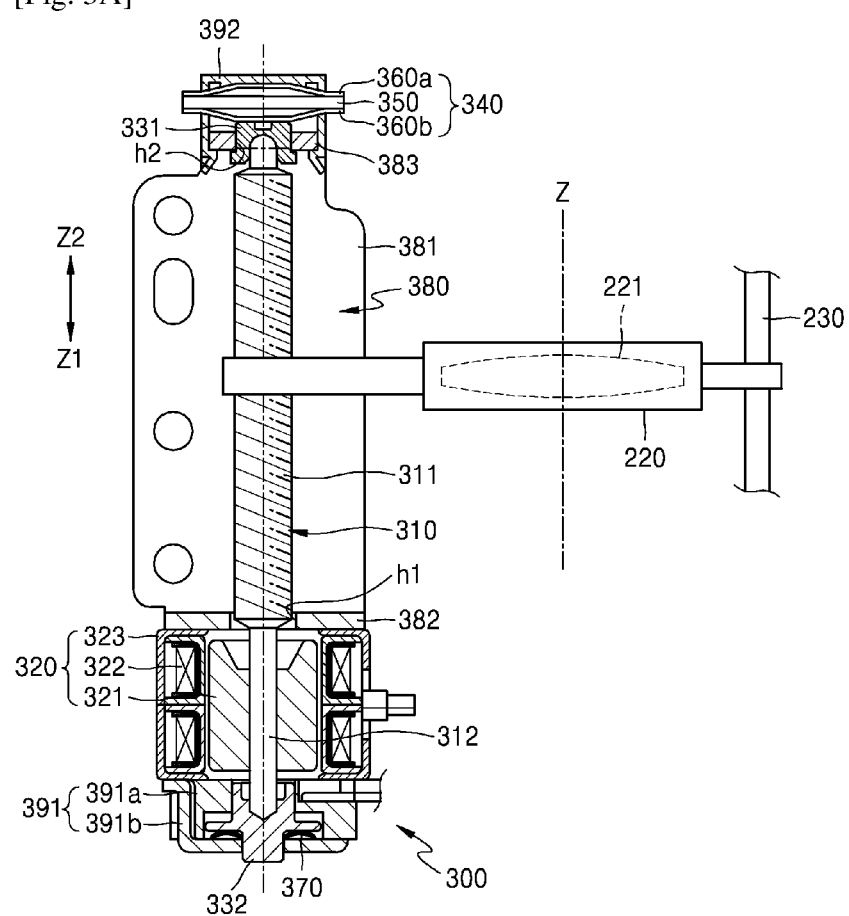
[Fig. 3A]

[Fig. 3B]
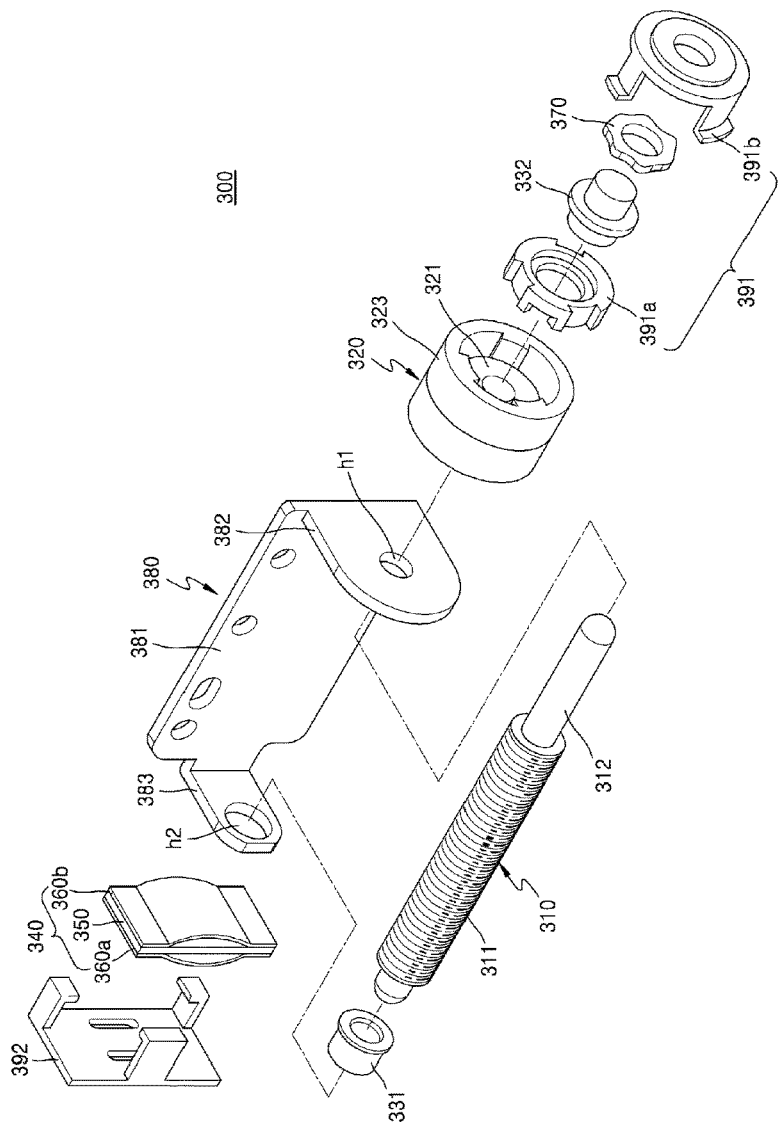
[Fig. 4]
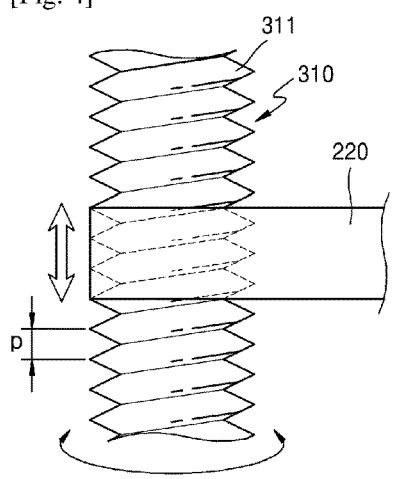

[Fig. 5]
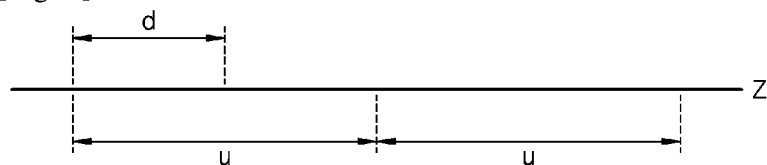
[Fig. 6]
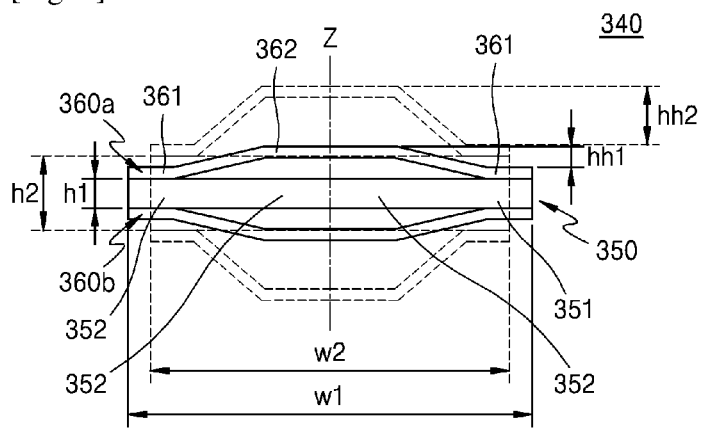

[Fig. 7]
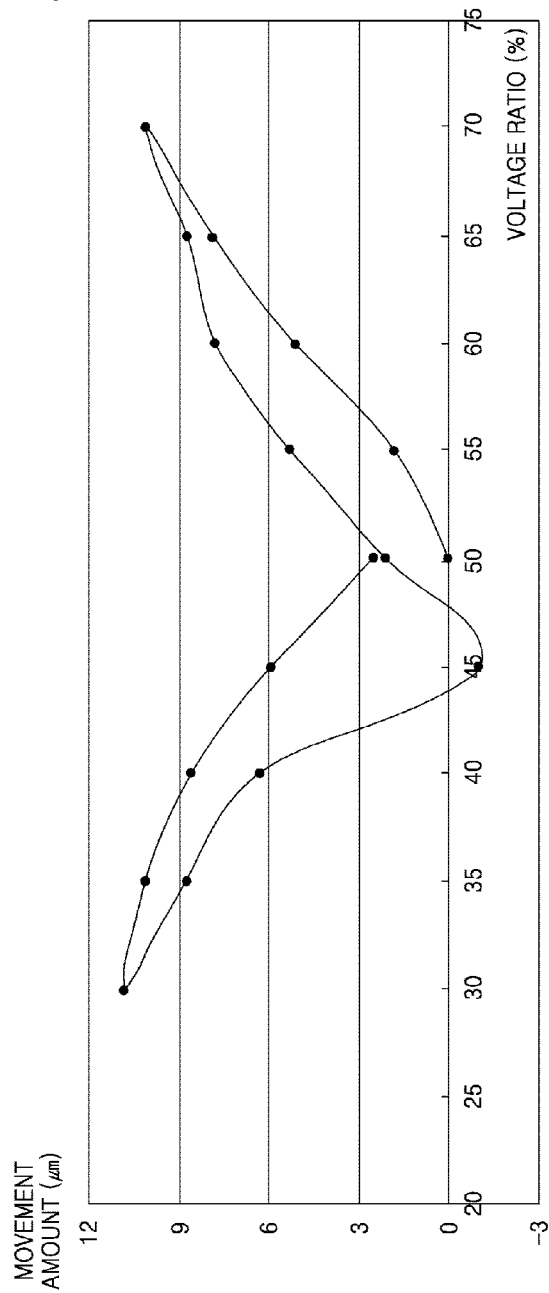

[Fig. 8A]
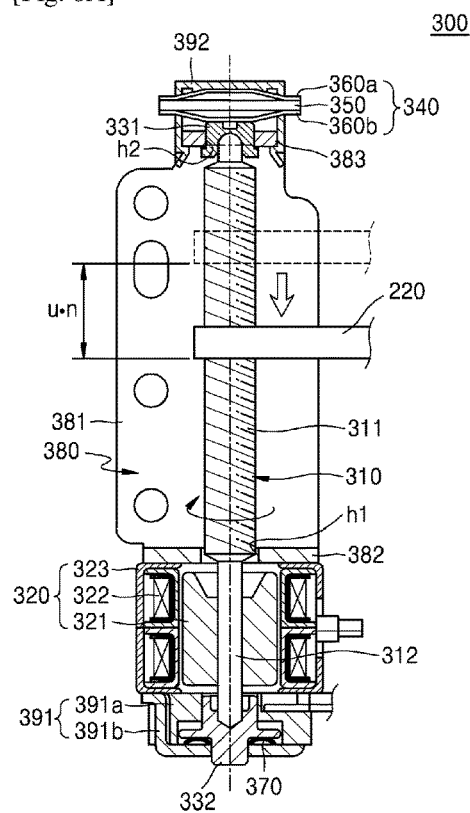
[Fig. 8B]
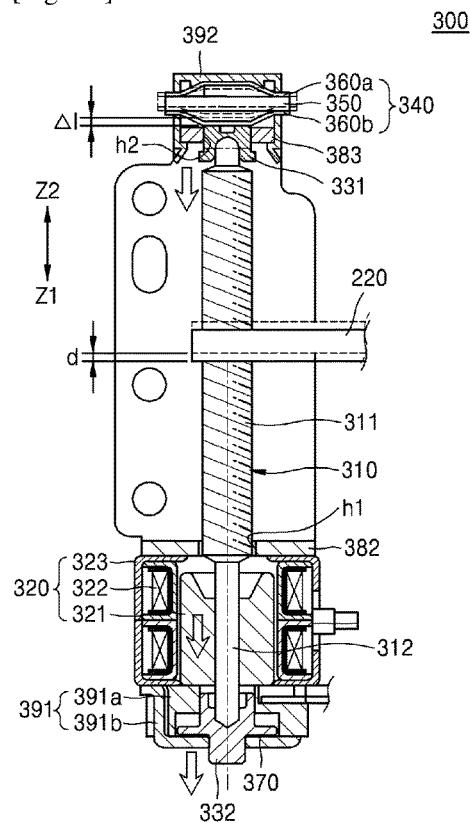

[Fig. 9]
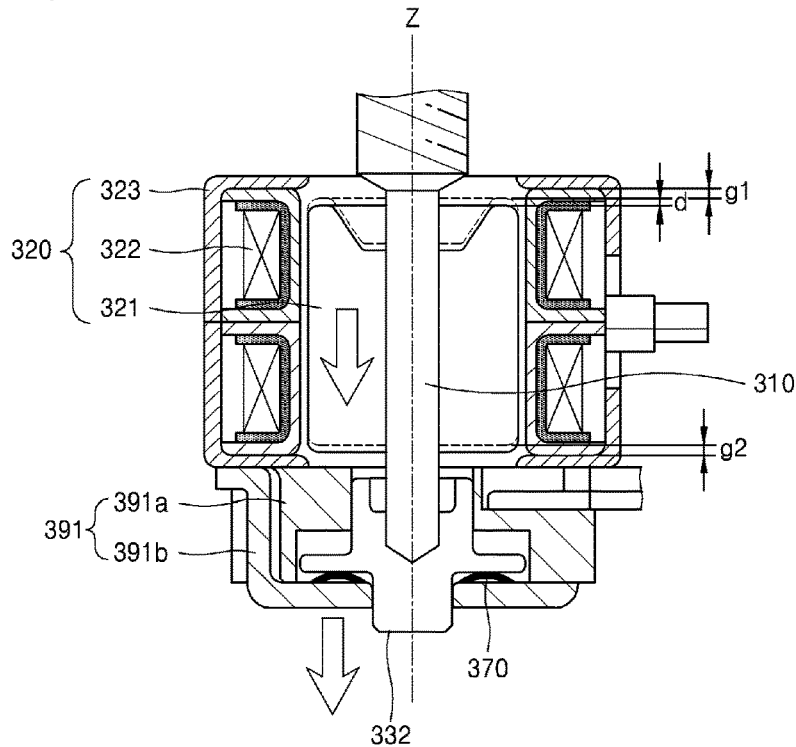
[Fig. 10]
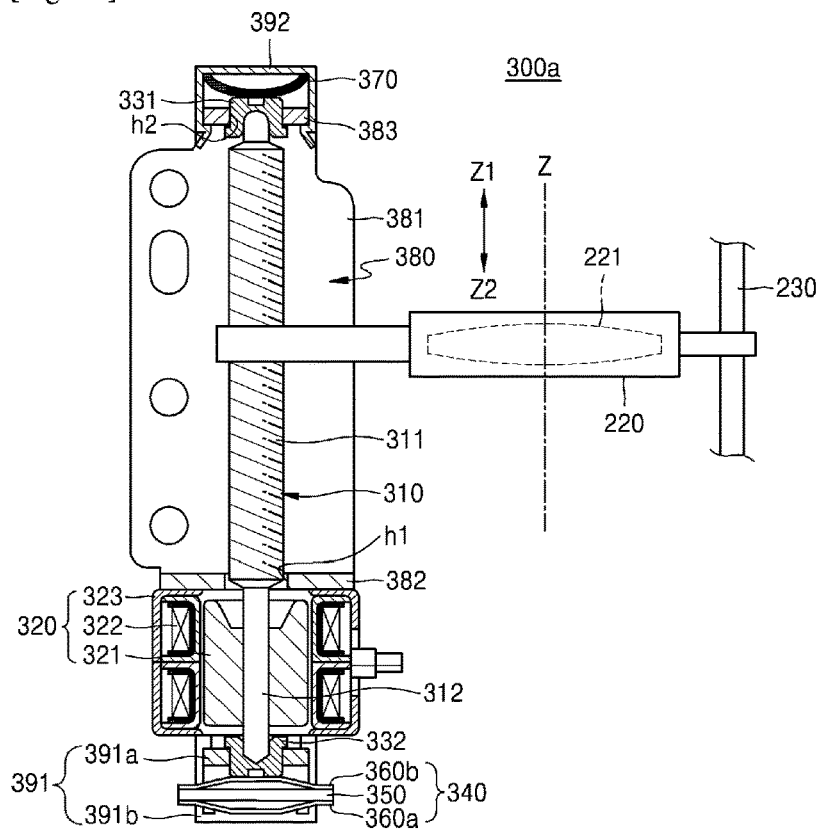

AUTOFOCUS DRIVING UNIT AND PHOTOGRAPHING APPARATUS HAVING THE SAME

TECHNICAL FIELD

One or more embodiments of the present invention relate to an autofocus driving unit and a photographing apparatus having the same, and more particularly, to an autofocus driving unit having an improved resolution and a photographing apparatus including the autofocus driving unit.

BACKGROUND ART

A photographing apparatus such as a digital camera or a camcorder includes a lens driving assembly that moves a lens in an optical axis direction. The lens driving assembly may perform an autofocus function of automatically adjusting a focus of a lens on a subject. To this end, the lens driving assembly may include an autofocus driving unit that moves the lens in the optical axis direction with respect to an image sensor.

The autofocus driving unit may include a lead screw to move the lens in the optical axis direction and a driving source that rotates the lead screw. As the driving source, various motors such as a direct current motor, an ultrasound motor, or a step motor may be used.

For example, in consideration of the weight and noise of the driving source, a step motor may be used as a driving source of the autofocus driving unit. Position precision and a driving speed of the autofocus driving unit including the lead screw and the step motor may be adjusted according to a pitch of screw threads of the lead screw.

If the pitch of the screw threads of the lead screw is increased to provide a high driving speed, position precision whereby the lens may be stopped may decrease.

On the contrary, if the pitch of the screw threads is reduced to improve position precision, the number of revolutions of the step motor has to increase, and this may cause noise or vibration.

Meanwhile, when the pitch of screw threads is maintained and a step motor having a relatively high number of steps per revolution are used in order to improve position precision, more magnet polarities are needed in a motor of the same size. Accordingly, an effective magnetic surface area in the motor is reduced, to thus result in a decrease in driving efficiency and driving torque.

DISCLOSURE OF INVENTION

Technical Problem

One or more embodiments of the present invention include an autofocus driving unit having a high resolution while increasing a moving speed of a lens, and a photographing apparatus including the autofocus driving unit.

Additional aspects will be set forth in part in the description which follows and, in part, will be apparent from the description, or may be learned by practice of the presented embodiments.

Solution to Problem

According to one or more embodiments of the present invention, an autofocus driving unit that moves a lens holder supporting at least one lens in an optical axis direction with respect to an image sensor, the autofocus driving unit including: a lead screw that has a length in a direction parallel to the optical axis direction and rotates to move the lens holder in the optical axis direction; a first driving source that rotates the lead screw so that the lead screw moves in multiple integers of a first distance in the optical axis direction and that includes a rotor mounted in an outer circumference of the lead screw and a stator that is spaced apart from the rotor and rotates the rotor; and a second driving source that moves the lead screw and the rotor in a first direction that is parallel to the optical axis with respect to the stator so that the lens holder is moved by a second distance that is different from the first distance in the optical axis direction.

The autofocus driving unit may further include first and second bearings that are respectively disposed at both end portions of the lead screw in a length direction and rotatably support the lead screw.

The second driving source may be mounted to an end portion of at least one selected from the first and second bearings. The second driving source may move the first and second bearings, the lead screw, and the rotor in the first direction.

The autofocus driving unit may further include an elastic member that provides an elastic force for at least one selected from the first and second bearings in a second direction opposite to the first direction.

The second driving source may include a variable member whose length is variable in the optical axis direction. The variable member may include at least one selected from a piezoelectric material, a magnetostrictive material, and a shape memory alloy.

A width of the variable member may be varied in a direction perpendicular to the optical axis when a length of the variable member is varied in the optical axis direction, and the second driving source may further include a conversion frame that converts width variation of the variable member to length variation of the conversion frame in the optical axis direction.

The conversion frame may include a contact portion that contacts the variable member and a separation portion that is separated from the variable member in the optical axis direction.

The second distance may be smaller than the first distance. The second distance may be from about 5 um to about 15 um.

A distance between the stator and the rotor in the optical axis direction may be greater than the second distance. The first driving source may be a step motor.

According to one or more embodiments of the present invention, a photographing apparatus includes: an image sensor; a lens holder for supporting a lens group; and an autofocus driving unit that moves the lens holder supporting at least one lens in an optical axis direction with respect to the image sensor, wherein the autofocus driving unit includes: a lead screw that has a length in a direction parallel to the optical axis direction and rotates to move the lens holder in the optical axis direction; a first driving source that rotates the lead screw so that the lead screw moves in multiple integers of a first distance in the optical axis direction and includes a rotor mounted in an outer circumference of the lead screw and a stator that is spaced apart from the rotor and rotates the rotor; and a second driving source that moves the lead screw and the rotor in a first direction that is parallel to the optical axis with respect to the stator so that the lens holder is moved by a second distance that is different from the first distance in the optical axis direction.

Advantageous Effects of Invention

As described above, according to the autofocus driving unit and the photographing apparatus including the same of the one or more of the above embodiments of the present invention, as the second driving source is additionally included to move the lead screw in the optical axis direction, both a moving speed of the lens and position precision of the lens may be improved. Also, revolutions of the first driving source are not necessary to increase to improve position precision, and thus, noise of the autofocus driving unit may be reduced.

BRIEF DESCRIPTION OF DRAWINGS

These and/or other aspects will become apparent and more readily appreciated from the following description of the embodiments, taken in conjunction with the accompanying drawings in which:

FIG. 1 is a schematic perspective view illustrating a photographing apparatus according to an embodiment of the present invention;

FIG. 2 is a block diagram illustrating a lens driving assembly according to an embodiment of the present invention;

FIG. 3A is a schematic view of an autofocus driving unit of FIG. 2 according to an embodiment, and FIG. 3B is a disassembled perspective view of the autofocus driving unit of FIG. 3A;

FIG. 4 is an enlarged view of a portion of a lead screw of FIG. 3A;

FIG. 5 is a conceptual diagram illustrating position movement of a lens holder in an autofocus driving unit according to an embodiment of the present invention;

FIG. 6 is an enlarged view of a second driving source of FIG. 3A;

FIG. 7 is a graph showing an experimentally measured movement amount of a lens holder as a voltage is applied to the second driving source illustrated in FIG. 3A;

FIGS. 8A and 8B are schematic views illustrating a lens holder being moved in an optical axis direction by using the autofocus driving unit of FIG. 3A;

FIG. 9 is an enlarged view of a first driving source of FIG. 8B; and

FIG. 10 is a schematic view illustrating an autofocus driving unit according to another embodiment of the present invention.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the present description, terms including ordinal numbers such as 'first,' 'second', etc. are used to describe various elements but the elements should not be defined by these terms. The terms are used only for distinguishing one element from another element. For example, without departing from the teaching of the present invention, a first element may also refer to a second element, and similarly, a second element may also refer to a first element. The term "and/or" includes any and all combinations of one or more of the associated listed items.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals indicated in the drawings denote elements that perform substantially the same function.

FIG. 1 is a schematic perspective view illustrating a photographing apparatus 100 according to an embodiment of the present invention.

Referring to FIG. 1, the photographing apparatus 100 may include a lens 101 and a flash 102 on a front surface thereof and a display screen (not shown) and manipulation buttons (not shown) corresponding to function control of the photographing apparatus 100 on a rear surface thereof. The photographing apparatus 100 may include a shutter button 103, a power button 104, and a strap attachment point (not shown) on a lateral surface which connects the front surface and the rear surface thereof. The buttons included in the photographing apparatus 100 may be implemented not only as physical buttons but also as touch buttons. Also, the photographing apparatus 100 may include a control unit 110 (processor) that controls driving of the photographing apparatus 100 and of a motor and a battery (not shown) from which power is supplied to the photographing apparatus 100.

The photographing apparatus 100 may include a mobile phone, a smartphone, a tablet PC, a digital camera, a camcorder, a digital single-lens reflex camera, or a mirrorless camera. Also, the photographing apparatus 100 may include an electronic device (not shown) capable of capturing a still image and/or a video by using at least one lens or at least one lens group assembly. The photographing apparatus 100 may be integrally mounted to the electronic device or may be separated from the electronic device. For example, a separated type photographing apparatus 100 may be connected to the electronic device in a wired or wireless manner, and may transmit or receive data that is obtained by photographing or is stored in the photographing apparatus 100 (for example, still images or videos) to or from the electronic device.

The photographing apparatus 100 includes the control unit 110 and a lens driving assembly 200 including at least one lens. The control unit 110, although not illustrated in detail in FIG. 1, is electrically connected to components of the photographing apparatus 100 that includes the lens driving assembly 200. The control unit 110 may include a processor (not shown), a read-only memory (ROM) storing a control program for controlling the photographing apparatus 100 or a random access memory (RAM) that is used as a storage area for various jobs performed in the photographing apparatus 100. The control unit 110 may be implemented by a microchip or a circuit board including a microchip, and the components included in the control unit 110 may be implemented by software and/or circuits embedded in the control unit 110.

The control unit 110 controls an overall operation of the photographing apparatus 100 and a signal flow between the components of the photographing apparatus 100, and processes data. Also, if there is a user input or conditions that are set and stored in advance are satisfied, the control unit 110 may execute an operating system (OS) and various applications.

The lens driving assembly 200 may perform an autofocusing function whereby a focus is automatically adjusted on a subject.

FIG. 2 is a block diagram illustrating the lens driving assembly 200 according to an embodiment of the present invention. Referring to FIG. 2, to implement an autofocusing function, the lens driving assembly 200 includes an image sensor 210, a lens holder 220 that supports at least one lens 221, and an autofocus driving unit 300.

The image sensor 210 captures image from light that has passed through the lens 221 and thus generates an image signal. The image sensor 210 may include a plurality of photoelectric conversion units arranged in a matrix and a vertical and/or horizontal transmission path along which charges are moved by using the photoelectric conversion units to start reading the image signal. Examples of the image sensor 210 include a charge coupled device (CCD) sensor and a complementary metal oxide semiconductor (CMOS) sensor.

The lens holder 220 supports the at least one lens 221. The lens holder 220 is movable from the image sensor 210 in an optical axis direction Z. To this end, the lens holder 220 may be guided to move in the optical axis direction Z by using a guide rod 230 (see FIG. 3A) that is extended in the optical axis direction Z.

The autofocus driving unit 300 moves the lens holder 220 with respect to the image sensor 210 in the optical axis direction Z. As the lens 221 supported by the lens holder 220 is moved forward or backward along the optical axis direction Z, the autofocusing function of the lens driving assembly 200 is performed.

FIG. 3A is a schematic view of the autofocus driving unit 300 of FIG. 2 according to an embodiment, and FIG. 3B is a disassembled perspective view of the autofocus driving unit 300 of FIG. 3A. FIG. 4 is an extended view of a portion of a lead screw 310 of FIG. 3A.

Referring to FIGS. 3A and 3B, the autofocus driving unit 300 includes a bracket 380, a lead screw 310, first and second bearings 331 and 332 disposed at two ends of the lead screw 310, a first driving source 320 that rotates the lead screw 310, and a second driving source 340 that moves at least one selected from the first and second bearings 331 and 332 in a direction parallel to the optical axis direction Z.

The bracket 380 is used to fix the autofocus driving unit 300 to other elements of the photographing apparatus 100. For example, by using the bracket 380, the autofocus driving unit 300 may be fixed to a body (not shown) on which the image sensor 210 is installed.

The first driving source 320 and the first bearing 331 may be mounted to the bracket 380. The bracket 380 includes a base plate 381, a first driving source support plate 382 that supports the first driving source 320, and a bearing support plate 383 on which the first bearing 331 is installed. The first driving source support plate 382 may be perpendicularly disposed at a first end portion of the base plate 381, and the bearing support plate 383 may be perpendicularly disposed at a second end portion of the base plate 381. A through hole h1 through which the lead screw 310 passes may be formed in the first driving source support plate 382, and a through hole h2 through which the first bearing 331 passes may be formed in the bearing support plate 383.

The lead screw 310 has a length parallel to the optical axis direction Z, and a screw thread 311 is formed in at least a portion of the lead screw 310. A pitch of screw threads 311 of the lead screw 310 may be from about 0.2 mm to about 0.6 mm.

The lens holder 220 is coupled to the screw thread 311 of the lead screw 310. Referring to FIG. 4, as the lead screw 310 rotates, the lens holder 220 coupled to the screw thread 311 of the lead screw 310 moves forward or backward along the optical axis direction Z. The lens holder 220 may move along the optical axis direction Z by a pitch p of the screw threads 311 when the lead screw 310 rotates one time.

The first driving source 320 is installed on the first driving source support plate 382 of the bracket 380. A portion 312 of the lead screw 310 is disposed to pass through the first driving source 320.

The first driving source 320 includes a rotor 321 mounted on an outer circumference of the lead screw 310 and stators 322 and 323 that are spaced apart from the rotor 321. For example, a magnet may be used as the rotor 321. The stators 322 and 323 may include a coil portion 322 via which the rotor 321 is rotated and a cover portion 323 that surrounds the coil portion 322 and fixes the coil portion 322 to the bracket 380. The cover portion 323 is fixed to the first driving source support plate 382. By supplying a voltage to the coil portion 322, the lead screw 310 on which the rotor 321 is mounted may be rotated. The lead screw 310 that passes through the first driving source 320 functions as a driving axis of the first driving source 320. By rotating the lead screw 310, the lens holder 220 coupled to the lead screw 310 may be moved in the optical axis direction Z.

The first bearing 331 and the second bearing 332 are disposed at the two ends of the lead screw 310 in a length direction. The first and second bearings 331 and 332 rotatably support the lead screw 310. A lubricant (not shown) may be disposed between the first bearing 331 and the lead screw 310 and between the second bearing 332 and the lead screw 310 for easy rotation of the lead screw 310.

The first bearing 331 is mounted to the bearing support plate 383 of the bracket 380, and the second bearing 332 is mounted to a bearing support holder 391. The bearing support holder 391 includes a center guide 391a that maintains a position of the second bearing 332 in a direction that crosses the optical axis direction Z and a cover 391b that covers at least a portion of the second bearing 332.

A step motor may be used as the first driving source 320. Steps per rotation of the first driving source 320 may be 10 steps, 20 steps, or 40 steps. The first driving source 320 may rotate the lead screw 310 at a predetermined angle per step. Accordingly, the lens holder 220 coupled to the lead screw 310 is moved in the optical axis direction Z in units of a first distance u. As there are an integer number (n) of steps in the first driving source 320, the lens holder 220 is moved by n times the first distance u. The first distance u is a unit of a distance that the lens holder 220 moves in the optical axis direction Z, and may be from about 5 um to about 60 um.

As the step motor is used as the first driving source 320, the lead screw 310 may be rotated or stopped at a predetermined angle without any additional feedback signal. Also, an increase in a weight of components regarding an autofocusing function may be minimized and noise may be reduced.

The first distance u which is a unit of a distance that the lens holder 220 moves in the optical axis direction Z is determined based on the number of steps per rotation of the first driving source 320 and the pitch p of screw threads of the lead screw 310.

For example, when the first driving source 320 is a step motor having 20 steps per rotation, and the pitch p of the screw threads of the lead screw 310 is 0.4 mm, the lead screw 310 rotates in units of 18 degrees (=360 degrees/20), and the lens holder 220 may be moved in the optical axis direction Z in units of 20 um (=0.4 mm/20). In this case, the first distance u may be 20 um. Alternatively, when the first driving source 320 is a step motor having 40 steps per rotation, and the pitch p of the screw threads of the lead screw 310 is 0.6 mm, the first distance u may be 60 um. Alternatively, when the first driving source 320 is a step motor having 40 steps per rotation, and the pitch p of the screw threads of the lead screw 310 is 0.2 mm, the first distance u may be 5 um.

The first distance u that is determined based on the number of steps of the first driving source 320 and the pitch p of the screw threads of the lead screw 310 is related to a moving speed and position precision of the lens holder 220. When the first distance u is relatively great, the lens holder 220 may be quickly moved in the optical axis direction Z, whereas position precision of the lens holder 220 in the optical axis direction Z may be decreased. On the contrary, when the first distance u is relatively small, position precision of the lens holder 220 in the optical axis direction Z may be improved but a moving speed of the lens holder 220 in the optical axis direction Z may be decreased. As described above, when moving the lens holder 220 to the first driving source 320 which is a step motor, an increase in the moving speed of the lens holder 220 and an improvement in precision of position movement thereof may be in a tradeoff relationship.

However, according to the present embodiment, the second driving source 340 separately from the first driving source 320 is used so that the lead screw 310 and the lens holder 220 coupled to the lead screw 310 may be moved by a second distance d which is different from the first distance u. In other words, the first driving source 320 is used without any change in relation to the moving speed of the lens holder 220; however, in relation to position precision of the lens holder 220, a decrease in the position precision of the lens holder 220 may be compensated for by using the second driving source 340.

FIG. 5 is a conceptual diagram illustrating position movement of the lens holder 220 according to the autofocus driving unit 300 according to an embodiment of the present invention.

Referring to FIGS. 3A and 5, the lens holder 220 is moved by using the first driving source 320 and the second driving source 340 along the optical axis direction Z.

By applying a voltage to the stators 322 and 323, the first driving source 320 rotates the rotor 321 and the lead screw 310 to which the rotor 321 is mounted. As the lead screw 310 rotates, the lens holder 220 coupled to the lead screw 310 is moved by n times the first distance u. The greater the first distance u, a moving speed of the lens holder 220 via the first driving source 320 is increased.

The second driving source 340 is length-variable in the optical axis direction Z and is disposed at an end portion of at least one selected from the first and second bearings 331 and 332. For example, the second driving source 340 is disposed at an end portion of the first bearing 31. As a length of the second driving source 340 is varied, the first bearing 331 may be moved along the optical axis direction Z. When the first bearing 331 is moved, the lead screw 310, the rotor 321, and the second bearing 332 are moved along the optical axis direction Z. Accordingly, the lens holder 220 is moved along the optical axis direction Z.

Due to the variation in the length of the second driving source 340, the lens holder 220 is moved along the optical axis direction Z by the second distance d which is different from the first distance u. By setting the second distance d, which is a distance that the lens holder 220 moves via the second driving source 340, to be different from the first distance u, the lens holder 220 may be moved within a smaller range than the first distance u. Accordingly, a resolution of the autofocus driving unit 300 may be improved.

The second distance d that is different from the first distance u may be, for example, smaller than the first distance u. However, the second distance d is not limited thereto, and may also be greater than the first distance u. When the second distance d is greater than the first distance u, the second distance d may be different from n times of the first distance u.

As described above, in order to move the lens holder 220 by the second distance d which is different from the first distance u, the second driving source 340 may include a variable member 350 whose length is variable in the optical axis direction Z. As the variable member 350, at least one selected from a piezoelectric material, a magnetostrictive material, and a shape memory alloy may be used. A piezoelectric material may be length-variable as molecules are aligned by an electrical field, and a magnetostrictive material may be length-variable as molecules are aligned by a magnetic field. Also, a shape memory alloy may be length-variable according to a temperature.

The second driving source 340 may move the first bearing 331 in a first direction Z1 that is parallel to the optical axis direction Z by using length variation of the variable member 350. As the first bearing 331 is moved in the first direction Z1, the lead screw 310 supported by the first bearing 331 and the second bearing 332 that is disposed at an end portion of the lead screw 310 are moved in the first direction Z1.

The first bearing 331 is disposed at a first end portion of the second driving source 340 in the optical axis direction Z, and a clip 392 is disposed at a second end portion of the second driving source 340. The clip 392 is fixedly mounted to the bracket 380 and prevents movement of the second end portion of the second driving source 340 in the optical axis direction Z. Accordingly, a driving force by the second driving source 340 may be transmitted without loss to the first bearing 331 in the first direction Z1.

The second driving source 340 may include conversion frames 360a and 360b disposed on at least one of two end portions of the variable member 350 in the optical axis direction Z. By using the conversion frames 360a and 360b, the first bearing 331 may be moved a distance greater than length variation of the variable member 350.

FIG. 6 is an extended view of the second driving source 340 of FIG. 3A. Referring to FIG. 6, the second driving source 340 includes the variable member 350 and the conversion frames 360a and 360b disposed on the two end portions of the variable member 350 in the optical axis direction Z.

As a voltage is supplied to the variable member 350, a length of the variable member 350 in the optical axis direction Z is varied. Here, a width of the variable member 350 is varied in a direction perpendicular to the optical axis direction Z. For example, the length of the variable member 350 in the optical axis direction Z may be increased from h1 to h2. When the length of the variable member 350 increases in the optical axis direction Z, the width of the variable member 350 in the direction perpendicular to the optical axis direction Z may be reduced from w1 to w2.

The conversion frames 360a and 360b convert width variation of the variable member 350 to length variation of the conversion frames 360a and 360b in the optical axis direction Z. For example, the conversion frames 360a and 360b may convert a width reduction of the variable member 350 to a length increase of the conversion frames 360a and 360b in the optical axis direction Z. To this end, for example, the conversion frames 360a and 360b include a contact portion 361 that contacts the variable member 350 and a separation portion 362 that is separated from the variable member 350 in the optical axis direction Z. The contact portion 361 contacts a circumference portion 351 of the variable member 350, and the separation portion 362 may be separated from a center portion 352 in the optical axis direction Z. The circumference portion 351 may be disposed outside the center portion 352.

As the width of the variable member 350 is reduced from w1 to w2, the contact portion 361 of the conversion frames 360a and 360b moves toward a center of conversion frames 360a and 360b. Accordingly, a distance between the separation portion 362 of the conversion frames 360a and 360b and the center portion 352 of the variable member 350 in the optical axis direction Z increases from hh1 to hh2.

Thus, a length of the second driving source 340 is varied to (h2−h1)+2(hh2−hh1) that is longer than a length h2−h1, which is a variation length of the variable member 350. The length of the second driving source 340, (h2−h1)+2(hh2−hh1), may be substantially the same as the second distance d. Accordingly, by using the second driving source 340, the first bearing 331, the lead screw 310, the second bearing 332, and the lens holder 220 may be moved by the second distance d. The second distance d which is a distance that the lens holder 220 is moved by using the second driving source 340 may be from about 5 um to about 15 um.

FIG. 7 is a graph showing an experimentally measured movement amount of the lens holder 220 as a voltage is supplied to the second driving source 340 illustrated in FIG. 3A. In FIG. 7, an x-axis denotes a voltage ratio percentage representing a range from −160V to +160V. Voltages of −160V, 0V, and +160V are respectively applied when voltage ratios are 0%, 50%, and 100%. Here, the variable member 350 was formed of a piezoelectric material.

Referring to FIG. 7, when a voltage ratio is 70%, that is, when a voltage of about 64 V is supplied to the second driving source 340, the lens holder 220 is moved up to about 10 um. By controlling a voltage supplied to the second driving source 340, the lens holder 220 may be moved by using the second driving source 340 within a range of 10 um.

Meanwhile, referring to FIG. 3A, the elastic member 370 may provide an elastic force to at least one selected from the first and second bearings 331 and 332 in a second direction Z2 opposite to the first direction Z1. For example, the elastic member 370 may provide an elastic force to the second bearing 332 in the second direction Z2. To this end, the elastic member 370 may be disposed between the second bearing 332 and the cover 391b.

When a length of the variable member 350 in the optical axis direction Z is reduced, the elastic member 370 may move the second bearing 332 in the second direction Z2. Accordingly, the lead screw 310, the rotor 321, the lens holder 220, and the first bearing 331 may be moved in the second direction Z2.

For example, a leaf spring as illustrated in FIG. 3A may be used as the elastic member 370. However, the elastic member 370 is not limited thereto, and as long as the elastic member 370 has an elastic shape and/or is formed of an elastic material, the elastic member 370 may be modified in various manners.

Hereinafter, movement of the lens holder 220 by using the autofocus driving unit 300 according to the above structure will be described.

FIGS. 8A and 8B are schematic views illustrating the lens holder 220 being moved by using the autofocus driving unit 300 of FIG. 3A, in the optical axis direction Z.

Referring to FIG. 8A, as a voltage is supplied to the first driving source 320, the lead screw 310 is rotated. As the first driving source 320 is a step motor, the lead screw 310 is rotated in units of a predetermined angle. As the lead screw 310 rotates in units of a predetermined angle, the lens holder 220 coupled to the lead screw 310 is moved along the optical axis direction Z by n times the first distance u. For example, when the first distance u is 20 um, the lens holder 220 may be moved by n times of 20 um according to driving of the first driving source 320.

Referring to FIG. 8B, as a voltage is supplied to the second driving source 340, a length of the second driving source 340 in the optical axis direction Z is varied. A length variation Δl of the second driving source 340 may be determined based on a length variation h2−h1 of the variable member 350 and a height variation 2·hh2−2·hh1 of the conversion frames 360a and 360b as described with reference to FIG. 6. According to the length variation Δl of the second driving source 340, the first bearing 331 contacting the second driving source 340, the lead screw 310 that is supported by using the first bearing 331, and the second bearing 332 are moved in the first direction Z1 by the second distance d. Here, the length variation Δl of the second driving source 340 is substantially the same as the second distance d.

The second distance d is different from the first distance u. For example, when the first distance u moved by the first driving source 320 is 20 um, the second distance d moved by the second driving source 340 may be 10 um. Thus, while increasing a moving speed of the lens holder 220 by increasing the first distance u moved by the first driving source 320, position movement of the lens holder 220 by the second driving source 340 may be conducted in a smaller range than the first distance u.

FIG. 9 is an extended view of the first driving source 320 of FIG. 8B. Referring to FIGS. 8B and 9, when a voltage is supplied to the second driving source 340, the lead screw 310 is moved by the second distance d in the first direction Z1 along the optical axis direction Z. As a position of the lead screw 310 is moved, the rotor 321 disposed on the outer circumference of the lead screw 310 may be moved relative to the stators 322 and 323 in the optical axis direction Z.

A predetermined pitch is provided between the rotor 321 and the stators 322 and 323 so that the rotor 321 may easily rotate. Gaps g1 and g2 between the stator 321 and the cover portion 323 in the optical axis direction Z may be greater than the second distance d whereby the lead screw 310 and the rotor 321 move. For example, the gaps g1 and g2 between the rotor 321 and the cover portion 323 in the optical axis direction Z may be from about 10 um to about 100 um. Accordingly, when the lead screw 310 is moved in the optical axis direction Z by the second distance d by using the second driving source 340 as illustrated in FIG. 8B, collision between the rotor 321 and the stators 322 and 323 may be prevented. Here, the gaps g1 and g2 between the rotor 321 and the cover portion 323 in the optical axis direction Z is defined as a gap between the rotor 321 and the cover portion 323 before the lead screw 310 moves in the optical axis direction Z.

Meanwhile, while the second driving source 340 is disposed at the first bearing 331, and the elastic member 370 is disposed at the second bearing 332 in the above-described embodiments, arrangement of the second driving source 340 and the elastic member 370 may be modified in various manners as long as the first and second bearings 332 and the lead screw 310 may be moved in the first direction Z1 by using the second driving source 340. FIG. 10 is a schematic view illustrating an autofocus driving unit 300a according to another embodiment of the present invention. For example, as illustrated in FIG. 10, in an autofocus driving unit 300a, the second driving source 340 may be disposed at the second bearing 332, and the elastic member 370 may be disposed at the first bearing 331. Here, a structure in which the second driving source 340 and the elastic member 370 are supported may be modified in an appropriate manner. Alternatively, although not illustrated in the drawings, without the elastic member 370, the second driving source 340 may be disposed at each of the first and second bearings 331 and 332.

As described above, according to the autofocus driving unit and the photographing apparatus including the same of the one or more of the above embodiments of the present invention, as the second driving source is additionally included to move the lead screw in the optical axis direction, both a moving speed of the lens and position precision of the lens may be improved. Also, revolutions of the first driving source are not necessary to increase to improve position precision, and thus, noise of the autofocus driving unit may be reduced.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism," "element," "unit," and "structure" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." The terms "comprising" and/or "including" used herein are to be understood as terms indicating open-type terminating sections of the technology.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An autofocus driving unit that moves a lens holder supporting at least one lens in an optical axis direction with respect to an image sensor, the autofocus driving unit comprising:
   a lead screw that has a length in a direction parallel to the optical axis direction and rotates to move the lens holder in the optical axis direction;
   first and second bearings that are respectively disposed at both end portions of the lead screw in a length direction and rotatably support the lead screw;
   a first driving source that rotates the lead screw so that the lead screw moves in multiple integers of a first distance in the optical axis direction and that comprises a rotor mounted in an outer circumference of the lead screw and a stator that is spaced apart from the rotor and rotates the rotor;
   a second driving source that moves the lead screw and the rotor in a first direction that is parallel to the optical axis with respect to the stator so that the lens holder is moved by a second distance that is different from the first distance in the optical axis direction, wherein the second driving source is mounted to an end portion of at least one selected from the first or second bearings and moves the first and second bearings, the lead screw, and the rotor in the first direction; and
   an elastic member that provides an elastic force for at least one selected from the first or second bearings in a second direction opposite to the first direction,
   wherein a distance between the stator and the rotor in the optical axis direction is greater than the second distance, so as to prevent collision between the stator and the rotor when the lead screw and the rotor move with respect to the stator in the first direction, and
   wherein the second distance is determined based on a distance between the rotor and a cover of the stator.

2. The autofocus driving unit of claim 1, wherein the second driving source comprises a variable member whose length is variable in the optical axis direction.

3. The autofocus driving unit of claim 2, wherein the variable member comprises at least one selected from a piezoelectric material, a magnetostrictive material, or a shape memory alloy.

4. The autofocus driving unit of claim 2,
wherein a width of the variable member is varied in a direction perpendicular to the optical axis when a length of the variable member is varied in the optical axis direction, and
wherein the second driving source further comprises a conversion frame that converts width variation of the variable member to length variation of the conversion frame in the optical axis direction.

5. The autofocus driving unit of claim 4, wherein the conversion frame comprises a contact portion that contacts the variable member and a separation portion that is separated from the variable member in the optical axis direction.

6. The autofocus driving unit of claim 1, wherein the second distance is smaller than the first distance.

7. The autofocus driving unit of claim 1, wherein the second distance is from about 5 um to about 15 um.

8. The autofocus driving unit of claim 1, wherein the first driving source is a step motor.

9. A photographing apparatus comprising:
an image sensor;
a lens holder configured to support a lens group; and
an autofocus driving unit configured to move the lens holder supporting at least one lens in an optical axis direction with respect to the image sensor,
wherein the autofocus driving unit comprises:
a lead screw that has a length in a direction parallel to the optical axis direction and rotates to move the lens holder in the optical axis direction;
first and second bearings that are respectively disposed at both end portions of the lead screw in a length direction and rotatably support the lead screw;
a first driving source that rotates the lead screw so that the lead screw moves in multiple integers of a first distance in the optical axis direction and comprises a rotor mounted in an outer circumference of the lead screw and a stator that is spaced apart from the rotor and rotates the rotor;
a second driving source that moves the lead screw and the rotor in a first direction that is parallel to the optical axis with respect to the stator so that the lens holder is moved by a second distance that is different from the first distance in the optical axis direction, wherein the second driving source is mounted to an end portion of at least one selected from the first or second bearings and moves the first and second bearings, the lead screw, and the rotor in the first direction; and
an elastic member that provides an elastic force for at least one selected from the first or second bearings in a second direction opposite to the first direction,
wherein a distance between the stator and the rotor in the optical axis direction is greater than the second distance, so as to prevent collision between the stator and the rotor when the lead screw and the rotor move with respect to the stator in the first direction, and
wherein the second distance is determined based on a distance between the rotor and a cover of the stator.

10. The photographing apparatus of claim 9,
wherein the second driving source comprises a variable member whose length is variable in the optical axis direction, and
wherein the variable member comprises at least one selected from a piezoelectric material, a magnetostrictive material, or a shape memory alloy.

11. The photographing apparatus of claim 10,
wherein a width of the variable member is varied in a direction perpendicular to the optical axis when a length of the variable member is varied in the optical axis direction, and
wherein the second driving source further comprises a conversion frame that converts width variation of the variable member to length variation of the conversion frame in the optical axis direction.

* * * * *